United States Patent
Scarberelli

(10) Patent No.: US 8,809,745 B1
(45) Date of Patent: Aug. 19, 2014

(54) INFANT BOTTLE AND FOOD WARMER

(76) Inventor: Racquel L. Scarberelli, Omaha, NE (US)

(*) Notice: Subject to any disclaimer, the term of this patent is extended or adjusted under 35 U.S.C. 154(b) by 5 days.

(21) Appl. No.: 13/412,669

(22) Filed: Mar. 6, 2012

(51) Int. Cl.
*F27D 11/00* (2006.01)

(52) U.S. Cl.
USPC ......................................................... 219/436

(58) Field of Classification Search
CPC .... A47J 36/2433; A47J 27/0804; A47J 27/04
USPC ......... 219/200, 385, 386, 391, 401, 429, 430, 219/432, 433, 436, 438, 441, 482, 490, 497, 219/520, 521, 535; 392/301, 441, 442; 99/275, 323.3, 324, 325, 331, 451, 483
See application file for complete search history.

(56) References Cited

U.S. PATENT DOCUMENTS

| | | | |
|---|---|---|---|
| 1,344,326 A * | 6/1920 | Williams | 126/20 |
| 1,977,482 A | 10/1934 | Klause | |
| 2,141,516 A | 12/1938 | Clements | |
| 2,501,193 A | 3/1950 | Schulte | |
| 3,119,925 A | 1/1964 | Shomock | |
| 3,495,583 A * | 2/1970 | Katzman et al. | 126/381.1 |
| 3,892,945 A | 7/1975 | Lerner | |
| 5,213,776 A | 5/1993 | Maniero et al. | |
| 6,237,469 B1 * | 5/2001 | Stritzl et al. | 99/330 |
| 6,861,618 B2 | 3/2005 | Binet et al. | |
| 6,906,289 B2 * | 6/2005 | Serres Vives et al. | 219/386 |
| 2006/0289439 A1 * | 12/2006 | Dreimann et al. | 219/401 |
| 2008/0041236 A1 * | 2/2008 | Raouf et al. | 99/323.3 |
| 2010/0230396 A1 * | 9/2010 | Boubeddi et al. | 219/399 |
| 2011/0014342 A1 | 1/2011 | Picozza et al. | |
| 2011/0192431 A1 * | 8/2011 | Semans | 134/166 R |
| 2011/0192830 A1 * | 8/2011 | Wilson | 219/386 |

* cited by examiner

*Primary Examiner* — Dana Ross
*Assistant Examiner* — Joseph Iskra
(74) *Attorney, Agent, or Firm* — Robert C. Montgomery; Montgomery Patent & Design

(57) ABSTRACT

A portable heating apparatus designed to heat infant bottles and food jars utilizes steam as the heating medium in order to provide a more thorough and effective heating environment. The apparatus is a small appliance operated by an electric power cord which plugs into a wall outlet or a motor vehicle's cigarette lighter. The apparatus has a large heating chamber accessed from a top of the apparatus and used to hold a baby bottle. A smaller heating chamber is accessed on a side of the apparatus and used to hold a small jar of baby food. The heating chambers are thermally insulated from an exterior enclosure of the apparatus to allow for safe handling. A bottom of the apparatus is used to house water which is heated via an electrical resistance heater to produce steam that is vented into the heating chambers.

8 Claims, 3 Drawing Sheets

INFANT BOTTLE AND FOOD WARMER

RELATED APPLICATIONS

Not Applicable.

FIELD OF THE INVENTION

The present invention relates generally to baby bottle and food warmers, and in particular, to a portable bottle and food container warming apparatus which utilizes steam heating to warm a baby bottle or baby food jar held within.

BACKGROUND OF THE INVENTION

The known art includes various heating devices for baby bottles, food jars, and similar containers. These devices ordinarily include an interior vessel for containing a quantity of water and a heating mechanism for boiling the water. The container which is to be warmed is typically placed into this boiling water bath to be warmed. In certain types of devices, the heating mechanism is operative as a result of the conduction of the water and must itself be inserted into the water vessel. In certain other types of devices, the heating mechanism is an electrical heating element in contact with the water vessel which is operative without the presence of water. Still in certain other types of devices, the heating element provides steam to warm the container held within a heating chamber.

Various inherent problems and disadvantages exist with these known devices. In particular, none are suitable for use in a travel situation as any water within the vessel will spill if the device is tipped. Another disadvantage is that the known devices which utilize hot water baths require direct contact between the container to be heated and the water. This requires the water level of the vessel to be suitable to immerse a substantial portion of the container. This method relies on a large amount of boiling water which can be hazardous and dangerous for a user of the device. Furthermore, since water is an electrically conductive substance, the potential danger of electrical shock exists if a short circuit should occur, thus permitting electrical current to pass through the water.

SUMMARY OF THE INVENTION

The inventor has recognized the aforementioned inherent problems and lack in the art and observed that there is a need for a means by which baby bottles and baby food container can be properly heated in an automated manner without the disadvantages described above. The principles of the present invention provide for a portable infant bottle and food container warmer.

Accordingly, it is an object of the present embodiments of the invention to address this need by providing a device that simple to operate and ensures the utmost in quality and consistency for the baby.

It is another object of the present invention to provide a device that reduces the stress and time requirements on the parent or care provider when preparing baby bottles and food.

It is another object of the present invention to provide a device that is safe for use and prevents the risk of injury to the user.

Still another object of the present invention is to provide a device that is easily transportable and can be used in various remote locations.

The inventor has thus realized the advantages and benefits of providing an infant bottle and food warming apparatus having various features for accomplishing at least one of the aforementioned objects.

A feature of the present invention is that the apparatus includes an outer enclosure having a top opening, a side opening, and a thermally insulating material disposed on an entire interior surface. A bottle heating cavity is disposed within the enclosure to receive a baby bottle. A jar heating cavity is disposed within the enclosure to receive a baby food jar. A top lid is hingedly attached to the enclosure top opening for providing access to the bottle heating cavity. A side lid is hingedly attached to the enclosure side opening for providing access to the jar heating cavity. A heating reservoir for holding a fluid is disposed within the enclosure and is in fluid communication with the bottle heating cavity and the jar heating cavity. A first steam line is fluidly connected between the heating reservoir and the bottle heating chamber. A second steam line is fluidly connected between the heating reservoir and the jar heating chamber. A fill port is disposed through a front surface of the enclosure and is in fluid communication with the heating reservoir. An electric heater is in contact with the heating reservoir for boiling the fluid to produce steam. A control mechanism is provided for controlling release of the steam to either the bottle heating cavity via the first steam line or to the jar heating cavity via the second steam line.

Another feature of the present invention is that the control mechanism includes a valve assembly connected to the first steam line and the second steam line for selecting a path for release of said steam. A control knob is mechanically connected to the valve assembly for manually actuating the valve assembly.

Another feature of the present invention is that the apparatus includes a power supply. The power supply includes a direct current power jack and a removably attachable DC power cord adapted for electrical connection to a DC power source. The power supply also includes an alternating current power jack, a step down transformer electrically connected to the alternating current power jack, and a removably attachable AC power cord adapted for electrical connection to an AC power source. A power selection switch is electrically connected to the direct current power jack and the alternating current power jack for actuating between the DC power source and the AC power source.

Another feature of the present invention is that the apparatus includes a DC indicator light electrically connected to the power selection switch for visually indicating a selected operative state of the apparatus when connected to the DC power source. An AC indicator light is electrically connected to the power selection switch for visually indicating a selected operative state of the apparatus when connected to the AC power source. A bottle heating cavity sensor electrically is electrically connected to a bottle temperature indicator light for actuating the bottle temperature indicator light when the bottle heating cavity has reached a preselected temperature. A jar heating cavity sensor is electrically connected to a jar temperature indicator light for actuating the jar temperature indicator light when the jar heating cavity has reached a preselected temperature.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following

Figure 1:
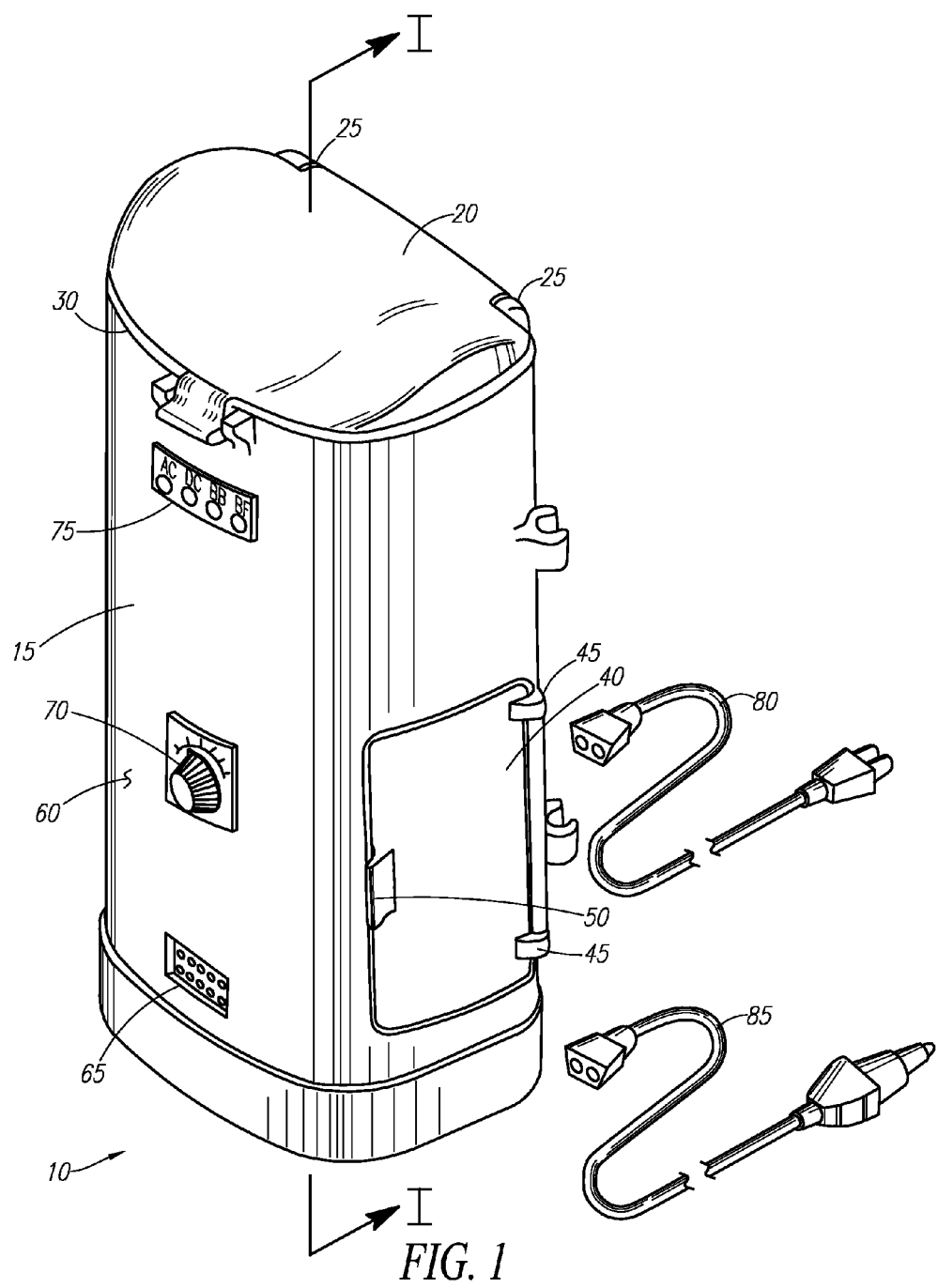
FIG. 1 is an isometric view of the infant bottle and food warmer, in accordance with the present invention.

DESCRIPTIVE KEY 10 infant bottle and food warmer
15 enclosure
20 top lid
25 top hinge
30 top clasp
35 baby bottle heating cavity
40 side lid
45 side hinge
50 side clasp
55 baby food jar heating cavity
60 front surface
65 water fill port
70 mechanical control knob
75 operational indicator lights
80 AC power cord
85 DC power cord
90 AC power jack
95 DC power jack
100 baby bottle
105 food jar
110 thermal insulating material
115 heating reservoir
120 electric heater
125 gate valve assembly
130 first steam line
135 second steam line
140 first vent opening
145 second vent opening
150 power selector switch
155 step down transformer
160 AC power indicator
165 DC power indicator
170 baby bottle heating cavity sensor
175 baby food heating cavity sensor
180 baby bottle temperature indicator
185 baby food temperature indicator

DETAILED DESCRIPTION OF THE PREFERRED EMBODIMENT

Figure 2:
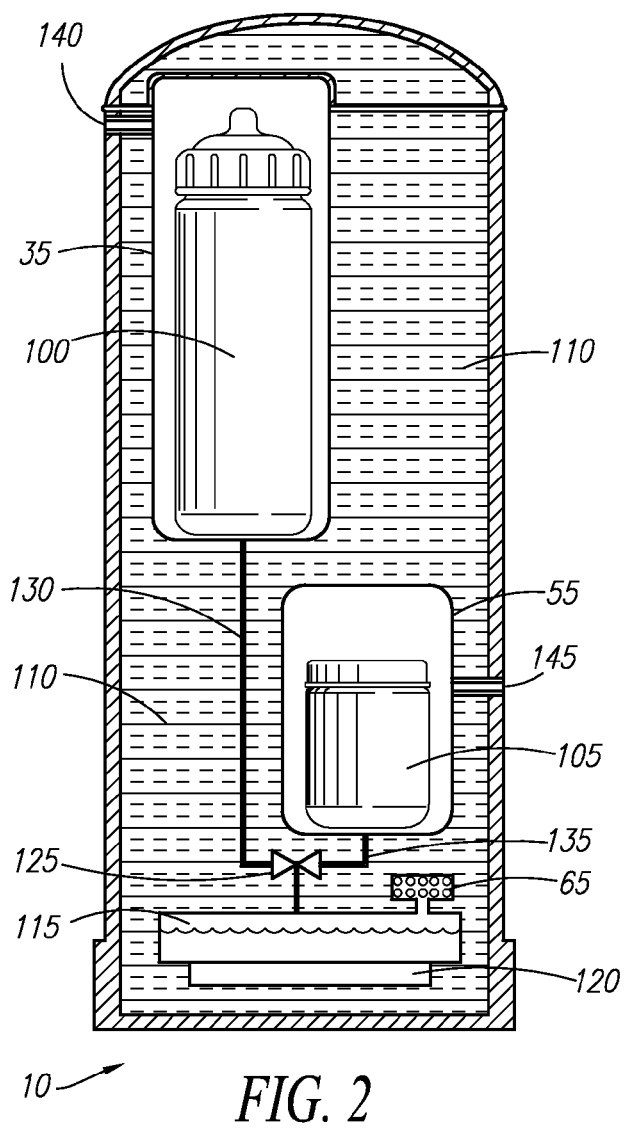
FIG. 2 is a sectional view of the infant bottle and food warmer, taken along a line I-I of FIG. 1; and, FIG. 3 is an electrical schematic depicting the interconnection of the major electrical components of the infant bottle and food warmer.
Figure 3:
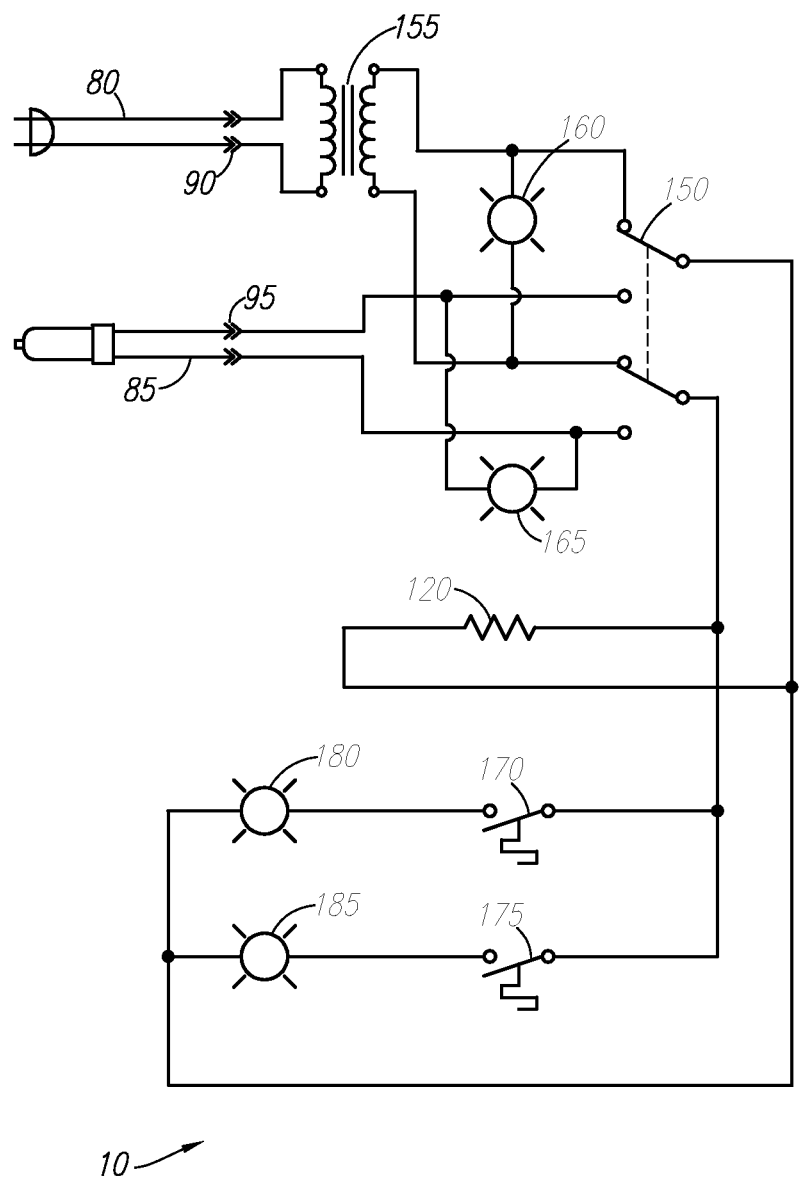

In accordance with the invention, the best mode is presented in terms of a preferred embodiment, herein depicted within FIGS. 1 through 3. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 3, depicting a infant bottle and food warmer (herein described as an "apparatus") 10, where like reference numerals represent similar or like parts. In accordance with the principles of the present invention, the apparatus 10 is a portable heating appliance designed to heat infant bottles and food utilizing heated steam as the heating medium in order to provide a more thorough and effective heating environment.

Referring to FIG. 1 the apparatus 10 is provided with an overall exterior enclosure 15 made of heavy-duty impact resistant plastic. The apparatus 10 is also provided with a top lid 20 which is connected to the apparatus 10 by a top hinge 25 and a top clasp 30. The top lid 20 is used to access a baby bottle heating cavity 35 (not shown in this figure). In a similar manner, the apparatus 10 is provided with a side lid 40 complete with a side hinge 45 and a side clasp 50. The side lid 40 is used to access a baby food jar heating cavity 55 (not shown in this figure). A front surface 60 is provide with a water fill port 65 which is used to fill the apparatus 10 with ordinary tap water which serves as a heating medium when converted to steam. Also present on the front surface 60 is a mechanical control knob 70 which is used to control the amount of steam that is released to either the baby bottle heating cavity 35 or the baby food heating cavity 55. Further detail of the mechanical control knob 70 will be provided herein below. The front surface 60 is also provided with a plurality of operational indicator lights 75. It is envisioned that the overall size of the infant bottle and food warmer 10 is approximately ten inches (10) in. tall, six inches (6 in.) wide, and four inches (4 in.) deep.

The apparatus 10 is powered by either an AC power cord 80 or a DC power cord 85 which electrically connect to an AC power jack 90 (not shown in this figure) or a DC power jack 95 (not shown in this figure) located on the rear surface of the apparatus 10. Further details on the AC power cord 80 and the DC power cord 85 will be provided herein below.

Referring to FIG. 2, this figure more clearly depicts the position and capabilities of the apparatus 10 with regards to the baby bottle heating cavity 35 and the baby food heating cavity 55 and their ability to heat a baby bottle 100 and a food jar 105 respectively. A layer of thermal insulating material 110 is located on the immediate backside interior of the entire enclosure 15 and serves to prevent the exterior of the in apparatus 10 from getting too hot and causing burns. It also serves to conserve heat and keep the baby bottle 100 or food bottle 105 at an elevated temperature even if the apparatus 10 should not be actively energized.

The water fill port 65 allows water to enter a heating reservoir 115 where it is heated to boiling by an electric heater 120. The resultant steam travels to a gate valve assembly 125 whereupon the steam is directed to either the baby bottle heating cavity 35 or the baby food heating cavity 55. The gate valve assembly 125 is mechanically connected to the mechanical control knob 70. In addition to controlling the direction of the steam, the gate valve assembly 125 also controls the amount of steam that is released from the heating reservoir 115, thereby regulating the temperature of the respective cavity. Steam travels via a first steam line 130 to the baby bottle heating cavity 35 or via a second steam line 135 to a baby food heating cavity 55 respectively.

Air pressure, which must be vented due to the entrance of steam, leaves the baby bottle heating cavity 35 via a first vent opening 140 and leaves the baby food heating cavity 55 via a second vent opening 145. During use, care must be taken by the user so as to not burn themselves on any venting steam. It is envisioned that the first vent opening 140 will be incorporated as a component of the top lid 20. Likewise, it is envisioned that the second vent opening 145 will be incorporated as a component of the side lid 40.

Referring to FIG. 3, power enters the apparatus 10 via the AC power jack 90 and the AC power cord 80 or via the DC power jack 95 and the DC power cord 85, respectively. Selection of the desired operating cord is made via a power selector switch 150 located on the rear surface of the apparatus 10 near the AC power jack 90 and the DC power jack 95. Power from the AC power jack 90 enters a step down transformer 155 which allows operation of the electric heater 120 at either an AC or DC potential of the same value. Selected operation is indicated by an AC power indicator 160 for AC power usage from the AC power cord 80 or via a DC power indicator 165 for DC power usage from the DC power cord 85, respectively. Power is applied to baby bottle heating cavity sensor 170 and a baby food heating cavity sensor 175 which senses the temperature of the baby bottle heating cavity 35 and the baby food heating cavity 55, respectively. Upon reaching the proper temperature, the baby bottle heating cavity sensor 170 closes and illuminates a baby bottle temperature indicator 180 or the baby food heating cavity sensor 175 closes and illuminates a baby food temperature indicator 185.

It is envisioned that the apparatus 10 would be constructed in general accordance with FIG. 1 through FIG. 3. Physical arrangements of the overall exterior enclosure 15 and the thermal insulating material 110 with regards to the top lid 20 and the side lid 40 would need to be incorporated to ensure proper size to functionality ratio. The steam generating components of the heating reservoir 115, the gate valve assembly 125, the first steam line 130, and the second steam line 135 would be placed inside the top hinge 25 along with the electrical components of the AC power cord 80, the DC power cord 85, and the electric heater 120 would be necessary.

It can be appreciated by one skilled in the art that other styles and configurations of the present invention can be easily incorporated into the teachings of the present disclosure and only certain particular configurations have been shown and described for purposes of clarity and disclosure and not by way of limitation of scope.

In accordance with the principles of the present invention, the various embodiments can be utilized by the user in a simple and effortless manner with little or no training in general accordance with FIG. 1 through FIG. 3. It can be appreciated that the steps described can be performed in alternative order and as such should not be viewed as a limiting factor. Prior to use, the apparatus 10 would be connected to a suitable source of AC or DC power via the AC power cord 80 or the DC power cord 85, respectively, and selected via the power selector switch 150. Water would then be added to the heating reservoir 115 via the water fill port 65. At this point in time, the apparatus 10 would be ready for utilization.

During operation of the apparatus 10, the user would place either the baby bottle 100 into the baby bottle heating cavity 35 or the food jar 105 into the baby food heating cavity 55. Selection of the desired heating cavity as well as the amount of steam to be utilized would be made by the mechanical control knob 70 which is mechanically connected to the gate valve assembly 125. Operation of the apparatus 10 would be monitored by using the operational indicator lights 75 consisting of the AC power indicator 160, the DC power indicator 165, the baby bottle temperature indicator 180 and the baby food temperature indicator 185. When the respective cavity has reached the proper temperature, the user would wait for the desired period of time to ensure proper and thorough heating of the baby bottle 100 or food jar 105. At this time point, the baby bottle 100 or the food jar 105 could be carefully removed and consumed. Any evaporated or boiled off water would be replaced in the heating reservoir 115, thus preparing the apparatus 10 for use again in a repeating cycle.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. An infant bottle and food warming apparatus comprising:
    an outer enclosure comprising a top, a bottom, a front, a back, and a pair of sides, said enclosure comprising a top opening disposed through said top and a side opening disposed through a side of said pair of sides;
    a bottle heating cavity disposed within said enclosure adapted to receive a baby bottle, said bottle heating cavity being accessible through said top opening, and said bottle heating cavity being sealable;
    a jar heating cavity disposed within said enclosure adapted to receive a baby food jar, wherein said baby food jar is generally smaller than said baby bottle, said jar heating cavity being accessible through said side opening, and said jar heating cavity being sealable;
    a thermally insulating material disposed on an entire interior surface of said enclosure and around said bottle heating cavity and said jar heating cavity;
    a top lid hingedly attached to said top of said enclosure for sealing said bottle heating cavity;
    a side lid hingedly attached to said side of said enclosure for sealing said jar heating cavity;
    a heating reservoir adapted for holding a fluid disposed within said enclosure and in fluid communication with said bottle heating cavity and said jar heating cavity;
    a first steam line fluidly connecting said heating reservoir and said bottle heating chamber;
    a second steam line fluidly connecting said heating reservoir and said jar heating chamber;
    a fill port disposed through said front of said enclosure and in fluid communication with said heating reservoir;
    an electric heater in contact with said heating reservoir adapted for boiling said fluid to produce steam, said steam being released to said bottle heating cavity individually, to said jar heating cavity individually, or to said bottle heating cavity and said jar heating cavity simultaneously;
    a control mechanism for controlling release of said steam to either said bottle heating cavity via said first steam line or said jar heating cavity via said second steam line or both said bottle heating cavity and said jar heating cavity; and,
    a power supply.

2. The apparatus of claim 1, wherein said control mechanism comprises:

a valve assembly connected to said first steam line and said second steam line for selecting a path for release of said steam; and, a control knob mechanically connected to said valve assembly for manually actuating said valve assembly.

3. The apparatus of claim 2, wherein said power supply comprises a direct current power jack and a removably attachable DC power cord adapted for electrical connection to a DC power source.

4. The apparatus of claim 3, wherein said power supply further comprises an alternating current power jack, a step down transformer electrically connected to said alternating current power jack, and a removably attachable AC power cord adapted for electrical connection to an AC power source.

5. The apparatus of claim 4, wherein said power supply further comprises power selection switch electrically connected to said direct current power jack and said alternating current power jack for actuating between said DC power source and said AC power source.

6. The apparatus of claim 5, further comprising:

a DC indicator light electrically connected to said power selection switch for visually indicating a selected operative state of said apparatus when connected to said DC power source;

an AC indicator light electrically connected to said power selection switch for visually indicating a selected operative state of said apparatus when connected to said AC power source;

a bottle temperature indicator light for visually indicating that said bottle heating cavity has reached a preselected temperature; and, a jar temperature indicator light for visually indicating that said jar heating cavity has reached a preselected temperature.

7. The apparatus of claim 5, further comprising:

a bottle heating cavity sensor electrically connected to said bottle temperature indicator light for actuating said bottle temperature indicator light when said bottle heating cavity has reached said preselected temperature; and, a jar heating cavity sensor electrically connected to said jar temperature indicator light for actuating said jar temperature indicator light when said jar heating cavity has reached said preselected temperature.

8. The apparatus of claim 7, wherein said top lid comprises a top clasp for sealing said bottle heating cavity closed and a first vent opening for venting said steam from said bottle heating chamber and said side lid comprises a side clasp for sealing said jar heating cavity closed and a second vent opening for venting said steam from said jar heating chamber.

* * * * *